N. & L. NILSON.
DISK PLOW.
APPLICATION FILED MAY 29, 1911.

1,119,862.

Patented Dec. 8, 1914.

WITNESSES

INVENTORS
NILS NILSON
LEONARD NILSON
BY Paul & Paul
ATTORNEYS

UNITED STATES PATENT OFFICE.

NILS NILSON AND LEONARD NILSON, OF WAYZATA, MINNESOTA.

DISK PLOW.

1,119,862.  Specification of Letters Patent.  Patented Dec. 8, 1914.

Application filed May 29, 1911. Serial No. 630,123.

*To all whom it may concern:*

Be it known that we, NILS NILSON and LEONARD NILSON, of Wayzata, Hennepin county, Minnesota, have invented certain new and useful Improvements in Disk Plows, of which the following is a specification.

The object of our invention is to provide a disk plow having means to prevent the dirt from clogging on the disk.

A further object is to provide a deep cutting subsoil plow.

A still further object is to provide a disk plow which will throw the dirt out laterally a sufficient distance to prevent it from falling back into the furrow.

Other objects of the invention will appear from the following detailed description.

The invention consists generally in a concavo-convex disk having wings spirally arranged on its convex side and extending from the center of the disk to the periphery thereof, whereby the dirt will be fed laterally in a spiral form.

Further the invention consists in various constructions and combinations, all as hereinafter described and particularly pointed out in the claims.

Figure 1:
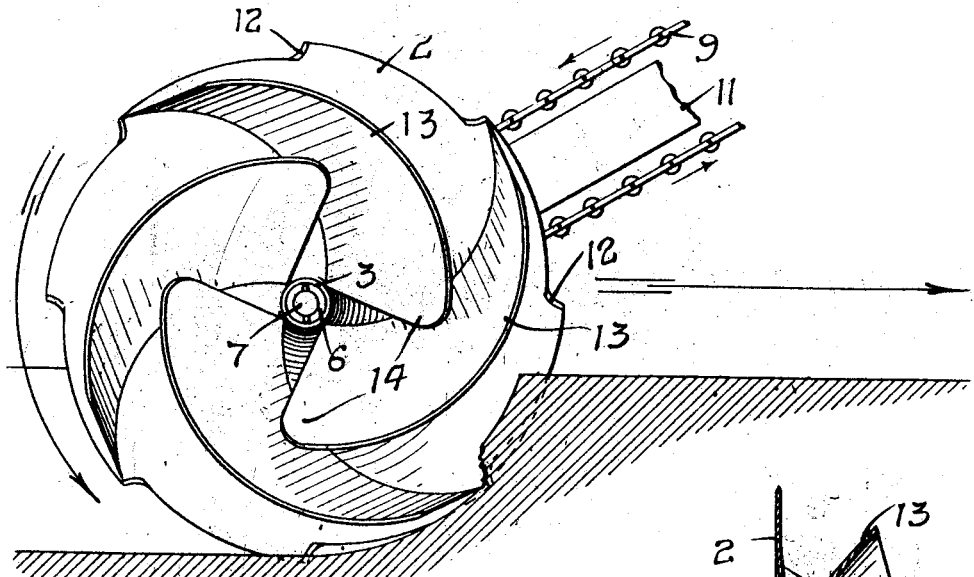
Figure 3:
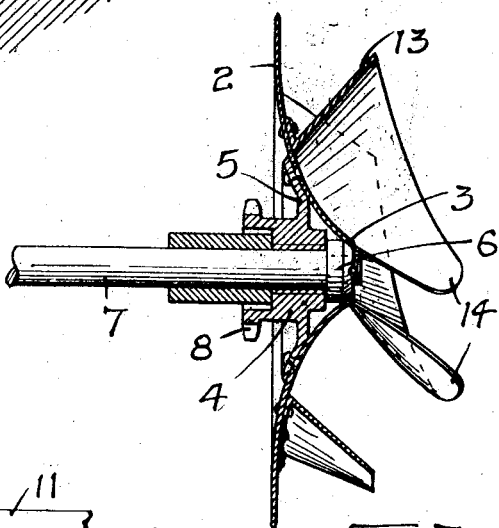
Figure 2:
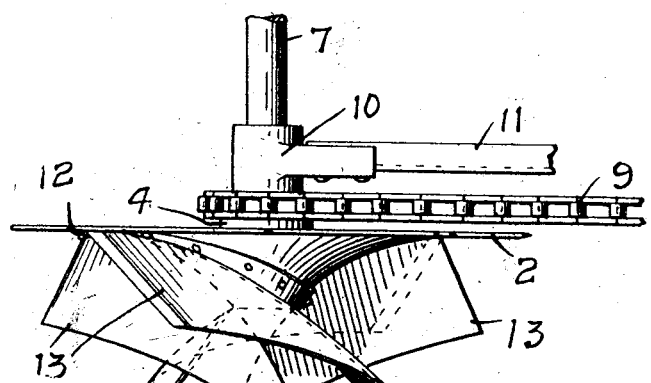

In the accompanying drawing forming part of this specification, Figure 1 is a side elevation of a disk plow embodying our invention, Fig. 2 is a plan view of the same, Fig. 3 is a vertical sectional view, showing the construction of the disk.

In the drawing, 2 represents the disk, concavo-convex in form, having preferably a central opening 3 and a hub 4 provided with an annular flange 5 whereto the disk is secured. A collar 6 is mounted on the end of a shaft 7 and has a bearing for the central portion of the disk around the opening therein. The hub 4 also has a sprocket wheel 8 formed thereon to receive a driving belt or chain 9 that is operated from a suitable source of power, not shown. A bracket 10 is provided for securing the shaft 7 to a frame 11, the bracket having a bearing in which the shaft 7 revolves. The edge of the disk is recessed to form cutting surfaces 12 at intervals, which operate to cut into the soil to the desired depth. Upon the convex side of the disk we arrange a series of blades 13. These blades have the functions of the mold boards and are spirally arranged between the center of the disk and its periphery, are tapered slightly from the center toward the outside of the disk and at their inner ends have projections or wings 14 which lie in planes at right angles substantially to the corresponding ends of the contiguous disks. The blades are also preferably inclined to the plane of the disk. The effect of this arrangement is to cause the soil to be moved centrally between the blades toward the middle portion of the disk from whence it is discharged laterally at one side of the disk, the spiral arrangement of the blades and their location with respect to one another preventing the soil from clogging or sticking to the surface of the disk. As the center disk enters the soil the dirt will be directed by the blades through the spiral channel formed between the blades toward the disk center and as the dirt falls from the center of the disk will be directed by the wings a sufficient distance to one side to prevent it from falling back in the furrow formed by the disk.

The plow may be made in various sizes and any suitable number of the spiral blades may be employed, according to the size of the disk and the character of the work to be performed thereby.

We claim as our invention:—

1. A rotary plow comprising a concavo-convex disk, a series of blades secured to the convex side of said disk, said blades being curved longitudinally and extending from a point near the axis of said disk to the periphery thereof, the outer ends of said blades having cutting edges and said blades being outwardly inclined with respect to the axis of said disk, said disk and said blades forming a series of spiral channels through which the soil is directed toward the central portion of said disk, the inner ends of said blades overhanging the middle portion of said disk and directing the soil cut by said blades away from the furrow.

2. A rotary plow comprising a concavo-convex disk, blades extending radially of said disk and having cutting edges at their outer ends, the inner end of each blade extending transversely past the corresponding end of the adjacent blade and spaced therefrom to form narrow channels between the blades, and all of said blades being outwardly inclined with respect to the axis of said disk.

3. A rotary plow comprising a disk having a recessed edge forming cutting surfaces at intervals thereon, and a series of blades mounted on said disk and having cutting edges at their outer ends adjacent to the alternate recesses in said disk.

4. A rotary plow comprising a disk having a substantially straight outer portion and a convex middle portion forming a continuation of said outer portion, a series of blades secured edgewise to the curved and straight outer portions of said disk, said blades having cutting edges at their outer end which project outwardly beyond the curved middle portion of said disk, comparatively narrow channels or passages being formed between the inner ends of adjacent blades and said disk, through which passages the material is directed, the outer portions of said blades and said disks directing the material into and through said channels.

5. A rotary plow comprising a disk having a recessed periphery provided with cutting edges, a series of blades mounted on said disk and having cutting edges adjacent to the edges of said recesses, the inner ends of said blades being disposed near the axis of said disk and outwardly inclined with respect thereto, the soil being directed between said blades and said disk and blades forming a series of spiral channels extending from the periphery of said disk toward the center thereof.

In witness whereof, we have hereunto set our hands this 24th day of May, 1911.

NILS NILSON.
LEONARD NILSON.

Witnesses:
GENEVIEVE E. SORENSEN,
EDWARD A. PAUL.